United States Patent
Kang

(10) Patent No.: US 6,333,684 B1
(45) Date of Patent: Dec. 25, 2001

(54) SECURITY DEVICE FOR PORTABLE COMPUTER AND METHOD THEREOF

(75) Inventor: Deog-Soo Kang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,716

(22) Filed: Dec. 31, 1998

(30) Foreign Application Priority Data

Dec. 31, 1997 (KR) .................................................. 97-80236

(51) Int. Cl.[7] ....................................................... H04Q 7/00
(52) U.S. Cl. ........................... 340/7.2; 340/7.1; 340/5.54; 340/5.74; 340/568.2; 340/571; 713/202; 713/185; 713/189; 455/412; 455/456
(58) Field of Search ............................. 340/825.44, 5.54, 340/5.74, 691.2, 568.2, 571, 7.1, 7.2; 713/202, 185, 189; 455/412, 456

(56) References Cited

U.S. PATENT DOCUMENTS

| | | | |
|---|---|---|---|
| 5,574,786 | * 11/1996 | Dayan et al. | 713/202 |
| 5,578,991 | * 11/1996 | Sholder | 340/571 |
| 5,736,932 | 4/1998 | Bulfer et al. | |
| 5,748,084 | 5/1998 | Isikoff | |
| 5,821,854 | 10/1998 | Dorinski et al. | |
| 5,872,515 | * 2/1999 | Ha et al. | 340/571 |
| 5,960,084 | * 9/1999 | Angelo | 713/185 |
| 5,964,877 | * 10/1999 | Victor et al. | 713/202 |
| 6,075,456 | * 6/2000 | Park | 340/825.44 |

* cited by examiner

Primary Examiner—Brain Zimmerman
Assistant Examiner—Yves Dalencourt
(74) Attorney, Agent, or Firm—Robert E. Bushnell, Esq.

(57) ABSTRACT

A security device and a method for controlling operating status of portable computers with a pager to prevent unauthorized access to information stored in the portable computers, in the event of a theft or a loss are disclosed. The security device for a portable computer comprises: a memory for storing pager processing routine; data processing means for receiving, storing, and determining paged information to generate a corresponding interrupt signal according to a determined result; and a controller for displaying a message or a telephone number, or for changing system password by performing the pager processing routine, according the interrupt signal from the data processing means. The security method for a portable computer comprises the steps of: receiving a paged information; determining the paged information after sensing the presence of power supply and generating an interrupt signal according a result of determined paged information; and controlling operating status of the portable computer according to a type of interrupt signal to prevent unauthorized access to the information stored in the portable computer.

6 Claims, 4 Drawing Sheets

SECURITY DEVICE FOR PORTABLE COMPUTER AND METHOD THEREOF

CLAIM OF PRIORITY

This application makes reference to, incorporates the same herein, and claims all benefits accruing under 35 U.S.C §119 from an application entitled Security Device For Portable Computer And Method Thereof earlier filed in the Korean Industrial Property Office on Dec. 31, 1997, and there duly assigned Ser. No. 97-80236 by that Office.

BACKGROUND OF THE INVENTION

1. Field of the Invention

The present invention relates to a security device and a method thereof for portable computers, and more particularly to a security device and a method for controlling an operating status of a portable computer with a pager to prevent unauthorized access to infonnation stored in the portable computer, in the event of a theft or a loss.

2. Description of the Related Art

In the conventional art, a locking device or a security device installed in portable computers are commonly used to prevent theft and provide security. Computer security has been a continuous problem in the art. Many personal computers are equipped with some type of security program to allow authorized users to access the computer and the data resident on the hard drive, while preventing unauthorized users from operating the computer. Typically, these security programs operate by preventing the complete boot-up of a computer without entry of a password by an authorized user. Usually these prior art systems also require a user to implement one of two options in which the user either manually enters a password to cause the security program to lock-out the computer, or to preset the computer to automatically lock the computer after some predetermined length of time when there is no activity at the computer. Thus, if a user walks away from his terminal, the computer will automatically lock after a predetermined time.

As computers and other expensive consumer electronic devices become smaller and more portable, the risk of their being stolen increases dramatically. Of particular concern is the theft of laptop computers.

Examples of known systems providing computer security are proved by U.S. Pat. No. 5,736,932 to Andrew Frederick Bulfer et al. entitled Security For Controlled Access Systems; U.S. Pat. No. 5,748,084 to Jeremy M. Isikoff entitled Device Security System; and U.S. Pat. No. 5,821,854 to Dale W. Dorinski et al. entitled Security System for Personal Computer.

SUMMARY OF THE INVENTION

It is an object of the present invention to provide a security device and a method for controlling operating status of the portable computers with a pager to prevent unauthorized access to information stored in portable computers, in the event of a theft or a loss.

The security device comprises a memory for storing a pager processing routine, data processing means for receiving, storing, and determining pager information to generate an interrupt signal according to determined information, and a controller for displaying a message or a telephone number, or for changing a system password by performing a pager processing routine, according the interrupt signal from the data processing means.

The security method for a portable computer comprises the steps of receiving pager information, determining the content of pager information after sensing the presence of a power supply and generating a corresponding interrupt signal according a result of determining the content of the pager information, and controlling the operating status of the computer according to the type of interrupt signal generated such as preventing unauthorized access to the portable computer.

Another security method for a portable computer comprises the steps of receiving pager information, determining the pager information type and generating a corresponding interrupt signal according to a result of determined pager information type, and stopping a program in use in presence of an interrupt signal and controlling the operating status of a portable computer according to a type of the interrupt signal to prevent further access of the portable computer.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
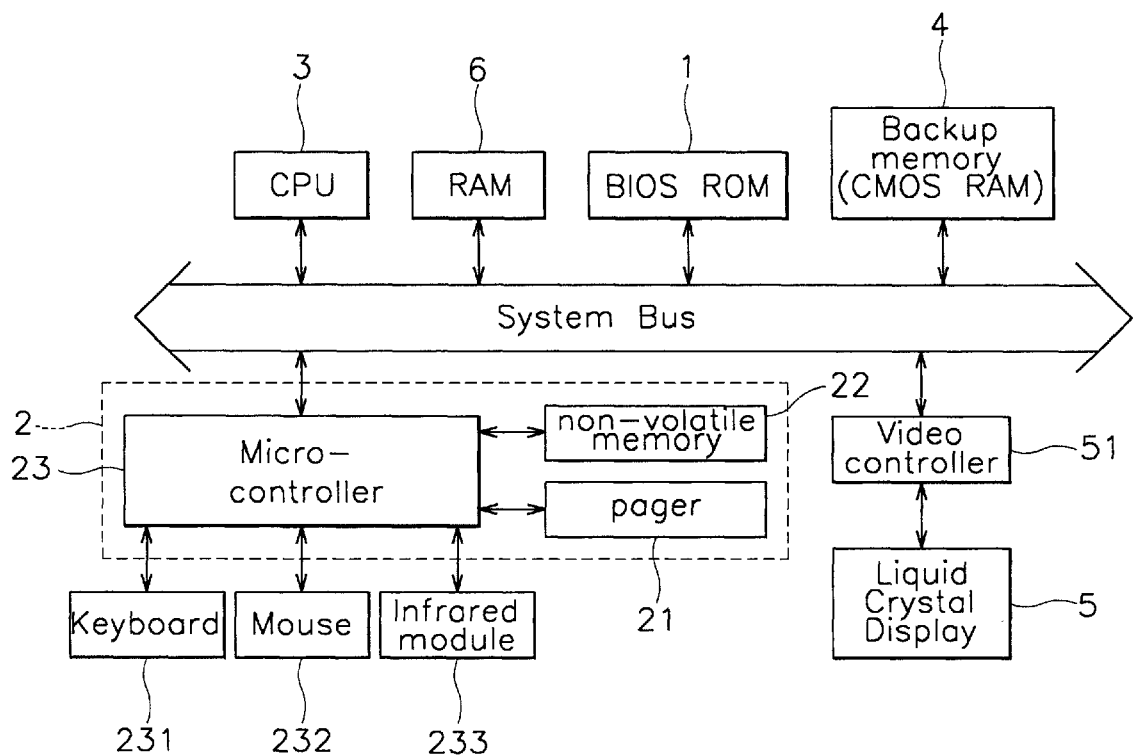
FIG. 1 is a block diagram showing a security device according to an preferred embodiment of the present vention.
Figure 2:
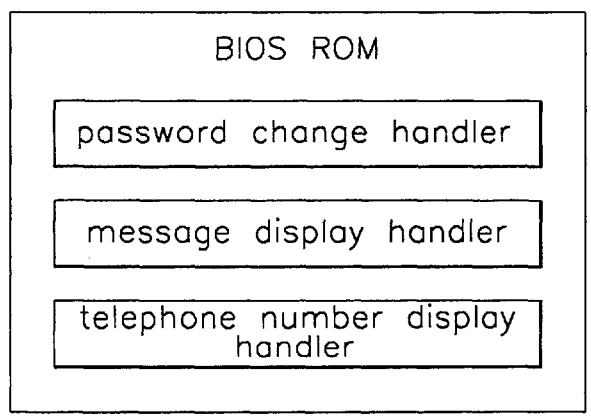
FIG. 2 is a diagram showing an internal structure of a BIOS ROM according to the preferred embodiment of the present invention.

As shown in FIGS. 1 and 2, a security device according to a preferred embodiment of the present invention comprises: a BIOS ROM 1 storing a POST (power on self test) routine, an input/output control routine, and a pager processing routine having a password change handler, a message display handler, and a telephone number display handler; and data processing means 2 for receiving, storing, and determining pager information to generate a password interrupt signal, a message interrupt signal, or a pager interrupt signal according to a determined information. The security device further comprises a central processing unit 3 for changing a system password by operating the password change handler, displaying a message on a liquid crystal display (LCD) 5 by operating the message display handler, or displaying a telephone number on the LCD 5 by operating the telephone number display handler, according to the interrupt signal from the data processing means 2.

The data processing means 2 comprises: a pager 21 for processing a paged information; a non-volatile memory 22 for storing the paged information, and a micro-controller 23 for controlling a keyboard 231, a mouse 232, and an infrared-module 233. The micro-controller 23 stores the paged information in a non-volatile memory 22, and determines whether the paged information is a new system password, a message, or a telephone number and generates a password interrupt signal, a message interrupt signal, or a pager interrupt signal, according to the determined result.

The first preferred security method of the present invention outlined in FIG. 3 will now be described in detail. The first preferred security method is a method which prevents the access of a lost or stolen portable computer, when the computer's power is off. After a portable computer has been lost or stolen, a user can send a desired information to the portable computer via telecommunication means such as telephone.

Figure 3:
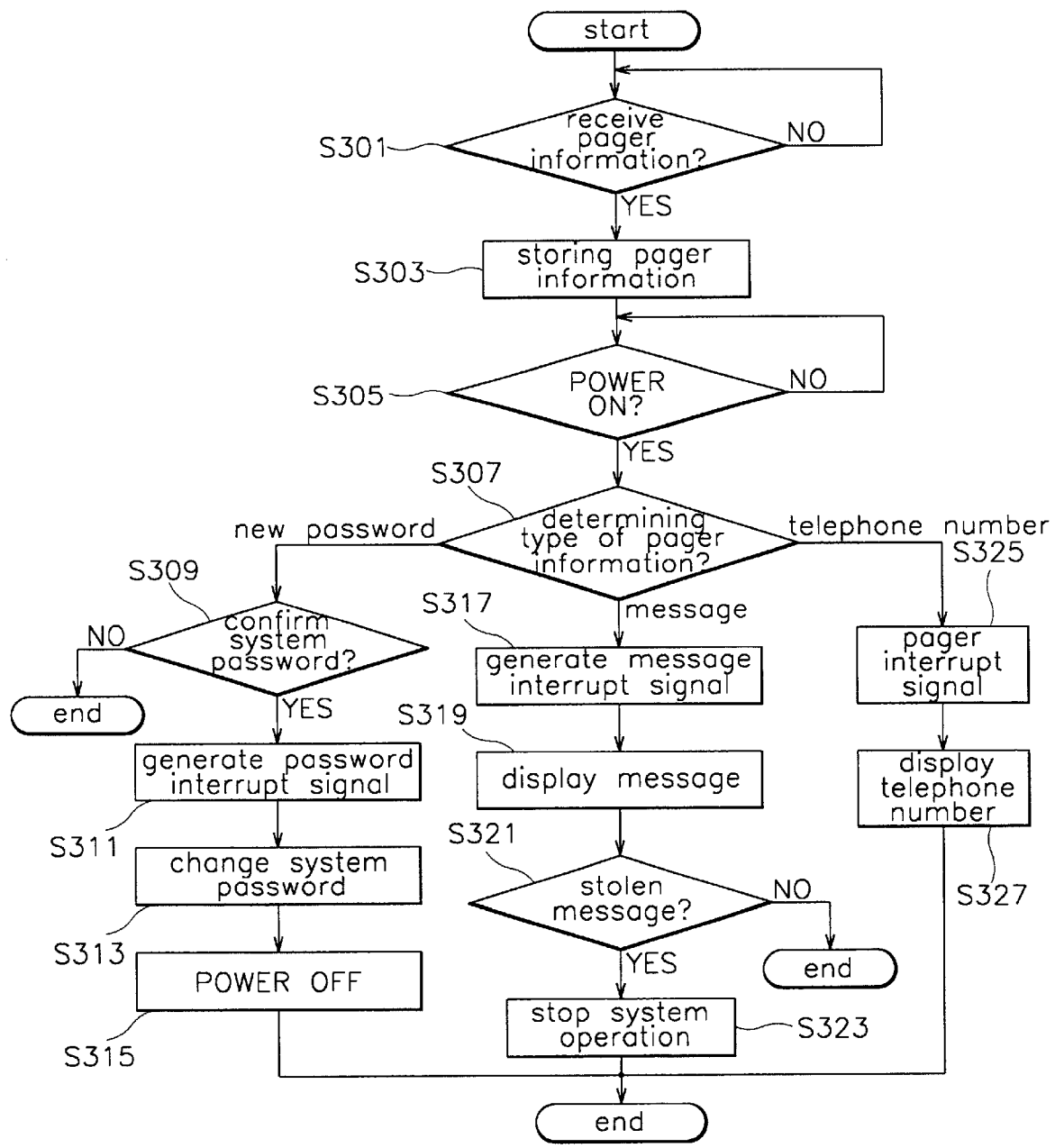
FIG. 3 is a flow chart showing a first preferred security method for a portable computer in accordance with the principles of the present invention.

In step S301, shown in FIG. 3, the pager 21 of the data processing means 2 operates, regardless of the operating status of the portable computer, and checks to see if paged information, for output it to the micro-controller 23, is received.

In step S303, the micro-controller 23 then stores received paged information in non-volatile memory 22, and senses the power supply of the portable computer (determines whether the computer is on or off) in step S305.

Afterwards, if the portable computer is supplied with power, the micro-controller 23, in step S307, reads data stored in non-volatile memory 22 and determines whether the paged information received by the pager 21 is a new password, a message, or a telephone number, and generates a message interrupt signal, or a pager interrupt signal when it is determined that the type of information is a message or telephone number, in steps S317 or S325, respectively. When it is determined that the type of paged information is a new password, then in step S309, if it is determined that the new password corresponds to a stored system password, a password interrupt signal is generated in step S319. If the new password does not correspond to the stored system password, the pager security routine ends here.

The interrupt signals generated from the micro-controller 23 are input to the central processing unit 3 via the system bus, after a POST-routine and an initial-routine have been performed. In order to process the signals, the central processing unit 3, prior to booting the computer, loads a corresponding handler stored in BIOS ROM 1 to the RAM 6.

Operating steps involved for each interrupt signal will now be described below in detail. First, operating steps following the presence of a password interrupt signal will be described. When the central processing unit 3 receives a password interrupt signal generated in step S311, the central processing unit 3 activates a password change handler of the pager processing routine stored in the BIOS ROM 1, for changing the system password stored in a backup memory (CMOS-RAM) 4 to a new password received by the pager 21, in step S313, and turns off the portable computer power supply in step S315. As a result, when the portable computer is lost or stolen, during the process of booting the computer by an intruder, the central processing unit 3 performs a password confirmation routine and asks for a system password, and executes the booting process if the system password is correct. Since the system password has been changed to a new password by the above steps, no one can access the portable computer except the owner.

Second, operating steps following the presence of a message interrupt signal will be described. When the central processing unit 3 receives a message interrupt signal generated in step S317, the central processing unit 3 activates a message display handler of the pager processing routine stored in the BIOS ROM 1, for displaying a paged message on a liquid crystal display (LCD ) 5 via the system bus and video controller 51, in step S319. At this time, if it is determined at step S321 that the paged message indicates "This portable computer is lost property", "This portable computer is stolen property", or a message of similar nature of being lost or stolen, the operation of the portable computer is stopped while the message is displayed on the LCD 5, in step S323. If the page message is not related to being lost or stolen, the pager security routine ends here in step S321.

Third, operating steps following the presence of a pager interrupt signal is will be described. When the central processing unit 3 receives a pager interrupt signal generated in step S325, the central processing unit 3 activates a telephone display handler of the pager processing routine stored in the BIOS ROM 1, for displaying a telephone number on a liquid crystal display (LCD) 5 via the system bus and a video controller 51 and ends the pager security routine, in step S327. Thereby, a person who has found the portable computer has means of contacting the owner.

Figure 4:
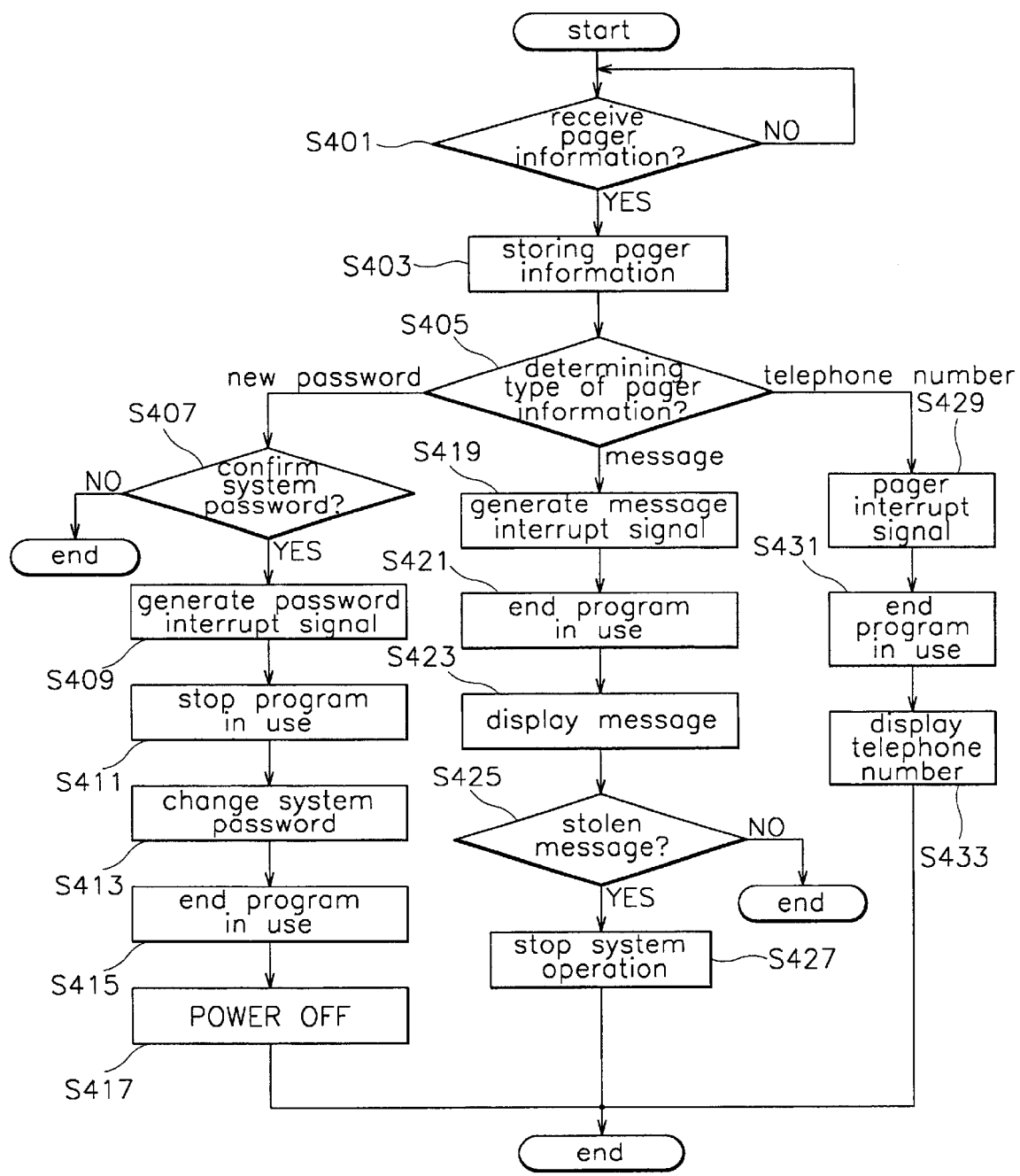
FIG. 4 is a flow chart showing a second preferred security method for a portable computer in accordance with the principles of the present invention.

The second preferred security method will now be described in detail with reference to FIG. 4. The second preferred security method is a method which prevents the access of a lost or stolen portable computer, when the computer is being used by an intruder. After a portable computer has been lost or stolen, a user can send desired information to the portable computer via telecommunication means such as telephone.

In step S401, the pager 21 of the data processing means 2 operates, irregardless of operating status of the portable computer, and receives the paged information and outputs it to the micro-controller 23. In step S403, the micro-controller 23 then stores the information in the non-volatile memory 22. Afterwards, the micro-controller 23, in step S405, reads the data stored in the non-volatile memory 21, and determines whether the paged information received by the pager 21 is a new password, a message, or a telephone number, and generates a message interrupt signal, or a pager interrupt signal in steps S419 or S429, respectively, according to the determined information. In step S407, if the paged information is a new password corresponding to a stored system password, a password interrupt signal is generated in step S409. If the password does not correspond to the stored system password, the pager security routine ends. When the interrupt signals generated, in steps S409, S419 or S429, from the micro-controller 23 are input to the central processing unit 3 via system bus, the central processing unit 3 loads a corresponding handler stored in BIOS ROM 1 according to the interrupt signal. Operating steps involved for each interrupt signal is described below in detail.

First, operating steps following the presence of a password interrupt signal will be described. When the central processing unit 3 receives a password interrupt signal generated in step S409, the central processing unit 3 stop operating a program in use in step S411; activates a password change handler of the pager processing routine stored in the BIOS ROM 1, for changing the system password stored in a backup memory (CMOS-RAM) 4 to the new password received by the pager 21, in step S413; ends the currently running program in step S415; and turns off the portable computer power supply in step S417. As a result, in case when the portable computer is lost or stolen, during the process of booting the computer by an intruder, the central processing unit 3 performs a password confirmation routine and asks for a system password, and executes the booting process if the system password is correct. Since the system password has been changed to a new password by the above steps, no one can access the portable computer except the owner.

Second, operating steps following the presence of a message interrupt signal will be described. When the central processing unit 3 receives a message interrupt signal generated in step S419, the central processing unit 3 stop operating the program in use in step S421, and activates a message display handler of the pager processing routine stored in the BIOS ROM 1, for displaying a paged message on a liquid crystal display (LCD ) 5 via the system bus and video controller 51, in step S423. At this time, in step S425, it is determined whether or not the paged message indicates "This portable computer is a lost property", "This portable computer is a stolen property", or a message of similar nature of being lost or stolen. The operation of the portable computer is stopped while the message is displayed on the LCD 5, and shuts off in step S427 if a positive result occurs in step S425. If it is determined that the page message is not related to being lost or stolen, the pager security routine ends in step S425.

Third, operating steps following the presence of a pager interrupt signal is will be described. When the central processing unit 3 receives a pager interrupt signal generated in step S429, the central processing unit 3 stops operating the program in use in step S431, activates a telephone display handler of the pager processing routine stored in the BIOS ROM 1, for displaying a telephone number on a liquid crystal display (LCD) 5 via the system bus and a video controller 51 in step S433, and ends the pager security routine in step S433. Thereby, a person who has found the portable computer has means of contacting the owner.

Alternatively, the owner can send a desired pager information via telecommunication methods using computers in addition to a telephone.

Figure 5:
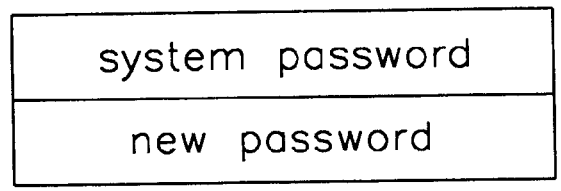
FIG. 5 is a map of a memory stored with a system password and a new password according to the first and second preferred security methods of the present invention.

FIG. 5 shows a memory map of a system password and a new password described in the first and second preferred security method.

As described in above, a preferred embodiment and methods according to the present invention prevent unauthorized access to information stored in a portable computer after being lost or stolen, by providing a pager for receiving a paged information sent by an owner, a micro-contrroller for generating a password interrupt signal, a message interrupt signal, or a pager interrupt signal to display a message or a telephone number of information transmitted to the pager, changing the system password, and to turn off the portable computer. Further, the present invention provides a liquid crystal display for displaying a contact telephone number, and makes it possible for someone to contact the owner, in case the computer was lost.

In the drawings and specification, there have been disclosed typical embodiments of the invention and, although specific terms employed, they are used in a generic and descriptive sense only and not for purposes of limitation, the scope of the invention being set forth in the following claims.

What is claimed is:

1. A security device for a portable computer comprising:
   a memory for storing a pager processing routine;
   data processing means for storing and determining a type of received paged information and for generating a corresponding interrupt signal according to a determined result; and
   a controller, said controller displaying a message indicating said portable computer is lost or stolen when it is determined that the paged information is a message, displaying a telephone number when it is determined that the paged information is a telephone number, and changing a system password when it is determined that the paged information is a new password, by performing the pager processing routine according to whether the interrupt signal from the data processing means is a pager interrupt signal, a message interrupt signal or password interrupt signal, respectively.

2. The security device for a portable computer according to claim 1, wherein the memory is BIOS ROM, and the pager processing routine includes a password change handler, a message display handler, and a pager display handler.

3. The security device for a portable computer according to claim 2, wherein the data processing means comprises:
   a pager for receiving a paged information;
   a non-volatile memory for storing the paged information; and
   a micro-controller for controlling a keyboard, a mouse, and an infrared-module, storing the paged information in the non-volatile memory, determining whether the paged information is a new system password, a message, or a telephone number, and for generating a password interrupt signal, a message interrupt signal, or a pager interrupt signal, according to the determined result.

4. The security device for a portable computer according to claim 3, wherein the controller is a central processing unit which controls the activation of a password change handler for changing a system password, a message display handler for displaying a message on a liquid crystal display (LCD), and a pager display handler for displaying a telephone number on the LCD, and for controlling an operation status of the portable computer by stopping a program in use or turning off power.

5. A security method for a portable computer comprising the steps of:
   receiving a paged information;
   determining the type of paged information received after sensing the presence of a power supply and generating a corresponding interrupt signal according a result of the determined type of paged information; and
   controlling operating status of the portable computer according to a type of interrupt signal to prevent the access of the portable computer, wherein the controlling step comprises the steps of:

turning off power supply after changing a system password stored in a backup memory to a new password by operating a password change handler, in presence of a password interrupt signal;

stopping system operations after displaying a paged message on a liquid crystal display by operating a message display handler, in presence of a message interrupt signal; and displaying a paged telephone number on the liquid crystal display by operating a telephone display handler, in presence of a pager interrupt signal.

6. A security method for a portable computer comprising the steps of:

receiving a paged information;

determining the type of paged information received and generating a corresponding interrupt signal according a result of determined type of paged information; and controlling an operating status of the portable computer by stopping a program in use in presence of the interrupt signal and by preventing further access of the portable computer according to a type of interrupt signal, wherein the controlling step comprises the steps of:

turning off power supply after stopping the program in use, and after changing a system password stored in a backup memory to a new password by operating a password change handler, in presence of a password interrupt signal;

stopping system operations after displaying a paged message on a liquid crystal display by operating a message display handler, in presence of a message interrupt signal; and displaying a paged telephone number on the liquid crystal display by operating a telephone display handler, in presence of a pager interrupt signal.

* * * * *